US010947894B2

(12) United States Patent
Niwa

(10) Patent No.: US 10,947,894 B2
(45) Date of Patent: Mar. 16, 2021

(54) OIL SUPPLY DEVICE

(71) Applicant: SUBARU CORPORATION, Tokyo (JP)

(72) Inventor: Yoshihisa Niwa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 497 days.

(21) Appl. No.: 15/872,325

(22) Filed: Jan. 16, 2018

(65) Prior Publication Data

US 2018/0283270 A1   Oct. 4, 2018

(30) Foreign Application Priority Data

Mar. 28, 2017 (JP) .............................. JP2017-063513

(51) Int. Cl.
*F02B 39/14* (2006.01)
*F02B 39/16* (2006.01)
(Continued)

(52) U.S. Cl.
CPC .............. *F02B 39/14* (2013.01); *F01D 25/16* (2013.01); *F01D 25/186* (2013.01); *F01M 1/18* (2013.01); *F01M 11/02* (2013.01); *F02B 39/16* (2013.01); *F01D 25/20* (2013.01); *F01D 25/24* (2013.01); *F01M 2011/021* (2013.01);
(Continued)

(58) Field of Classification Search
CPC .......... F02B 39/14; F02B 39/16; F01D 25/16; F01D 25/20; F01M 2011/021; F01M 1/18; F16N 23/00
See application file for complete search history.

(56) References Cited

U.S. PATENT DOCUMENTS 5,503,130 A * 4/1996 Pomeisl .................... F01L 1/44
123/146.5 A
6,745,568 B1 * 6/2004 Squires ................... F02B 33/44
184/6.11
(Continued)

FOREIGN PATENT DOCUMENTS

JP   2005-009434 A   1/2005
JP   2016-196864 A   11/2016

OTHER PUBLICATIONS

Japanese Office Action dated Aug. 28, 2018 for JP Patent Application No. 2017-063513 (3 pages in Japanese with English translation).

*Primary Examiner* — Michael R Mansen
*Assistant Examiner* — Mark K Buse
(74) *Attorney, Agent, or Firm* — Smith, Gambrell & Russell, LLP

(57) ABSTRACT

An oil supply device configured to supply oil to a turbocharger of an engine includes a first oil pump, a second oil pump, a first valve, and a second valve. The first oil pump is coupled to a bearing unit of the turbocharger via an oil supply path, and configured to supply oil to the bearing unit. The second oil pump is coupled to the bearing unit via an oil discharge passage, and configured to suck oil from the bearing unit. The first valve is provided in the oil supply path. The first valve is switchable from a connected state to a disconnected state when the engine is to be stopped. The second valve is provided in the oil discharge passage. The second valve is switchable from a connected state to a disconnected state when the engine is to be stopped.

20 Claims, 7 Drawing Sheets

(51) Int. Cl.
*F01D 25/16* (2006.01)
*F01D 25/20* (2006.01)
*F01M 1/18* (2006.01)
*F01M 11/02* (2006.01)
*F01D 25/18* (2006.01)
*F01D 25/24* (2006.01)
*F16N 23/00* (2006.01)

(52) U.S. Cl.
CPC .......... *F05D 2220/40* (2013.01); *F16N 23/00* (2013.01); *F16N 2280/00* (2013.01)

(56) References Cited

U.S. PATENT DOCUMENTS

| | | | |
|---|---|---|---|
| 2004/0138018 A1* | 7/2004 | Hayakawa | F16H 7/0836 474/122 |
| 2010/0084019 A1* | 4/2010 | Burke | F01L 1/3442 137/1 |

* cited by examiner

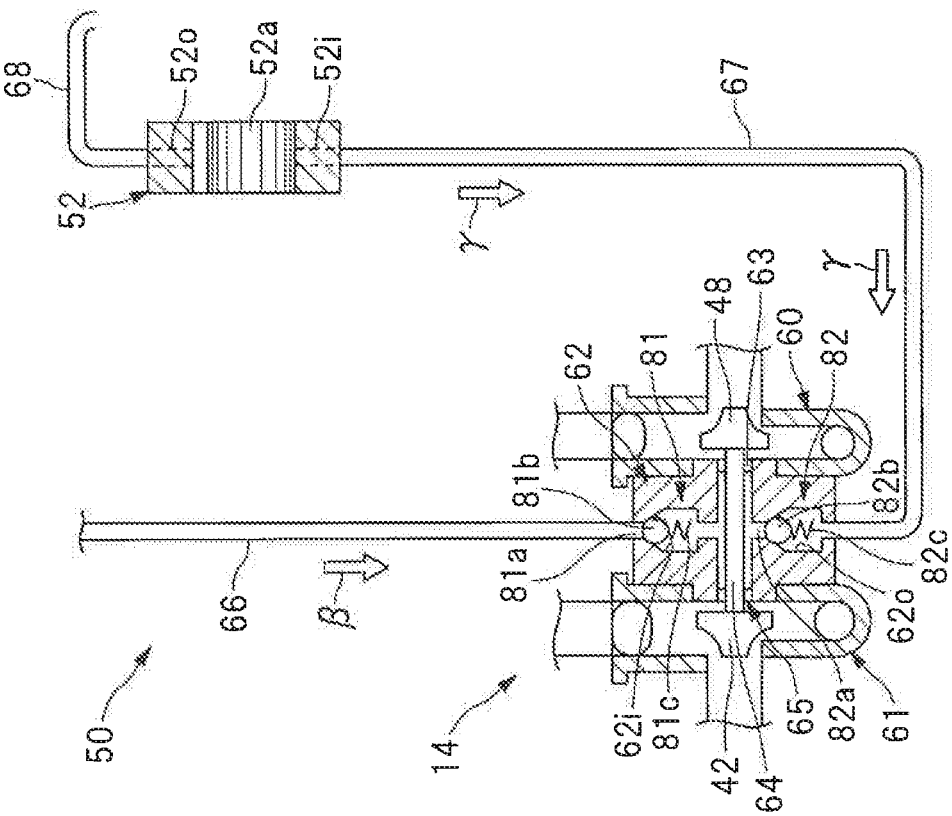
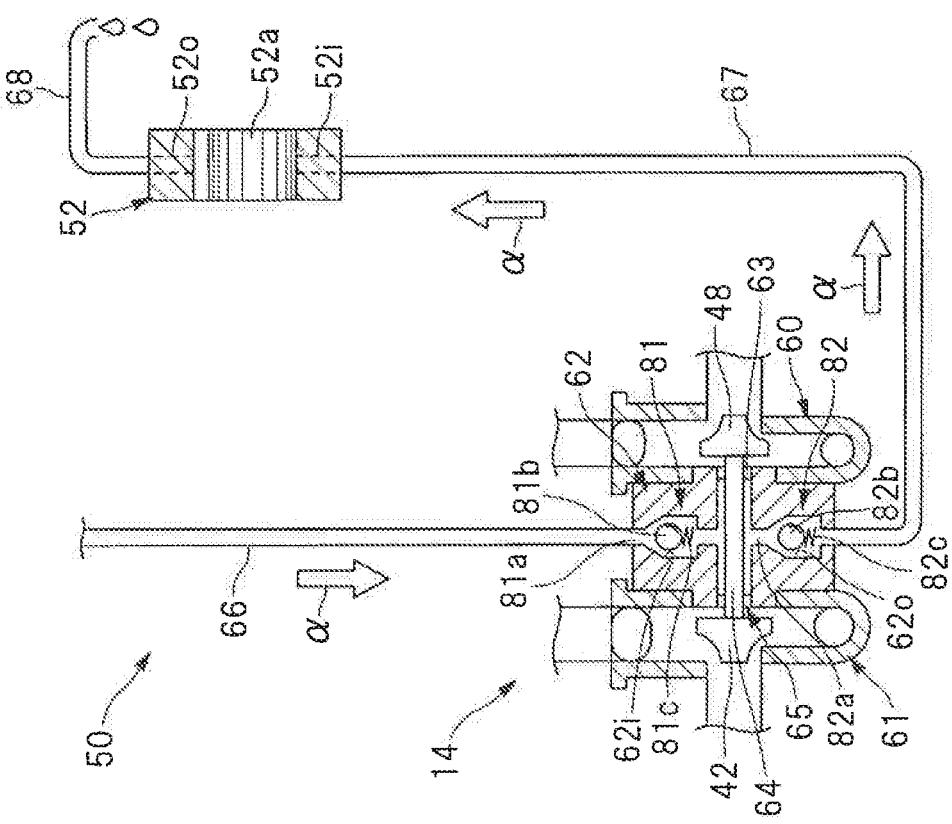
FIG. 5A
FIG. 5B

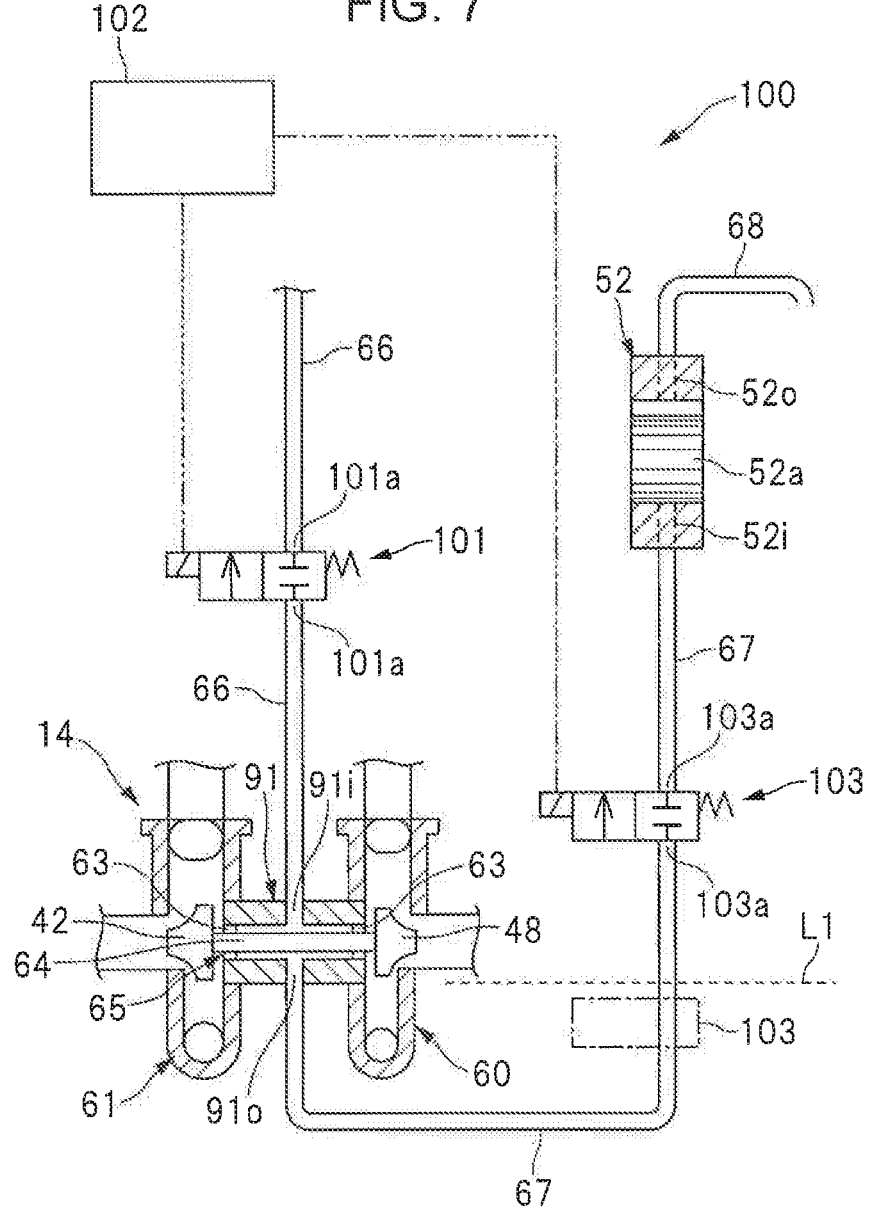

OIL SUPPLY DEVICE

CROSS-REFERENCE TO RELATED APPLICATIONS

The present application claims priority from Japanese Patent Application No. 2017-063513 filed on Mar. 28, 2017, the entire contents of which are hereby incorporated by reference.

BACKGROUND

1. Technical Field

The present invention relates to an oil supply device that supplies oil to a turbocharger of an engine.

2. Related Art

Engines are provided with an oil pump which is driven by a crankshaft, and oil is supplied from the oil pump to parts needing lubrication, such as a crank journal. Also, in an engine provided with a turbocharger, oil is supplied not only to parts needing lubrication, such as a crank journal, but also a bearing unit of the turbocharger (see Japanese Unexamined Patent Application Publication No. 2016-196864).

However, depending on the mounting position of the turbocharger or installment of the oil pipe, oil is likely to stay in the bearing unit of the turbocharger, and thus it is necessary to suck the oil from the bearing unit using a scavenging pump or the like to protect against overflow of oil from the bearing unit. However, when a scavenging pump is stopped due to stopping of the engine, oil may flow from an oil passage in the surrounding into the bearing unit below during the engine stop, and oil may overflow from the bearing unit.

SUMMARY OF THE INVENTION

It is desirable to provide a device that prevents an excessive oil flow into the bearing unit during the engine stop.

An aspect of the present invention provides an oil supply device configured to supply oil to a turbocharger of an engine. The oil supply device includes a first oil pump, a second oil pump, a first valve and a second valve. The first oil pump is coupled to a bearing unit of the turbocharger via an oil supply path, and configured to supply oil to the bearing unit. The second oil pump is coupled to the bearing unit via an oil discharge passage, and configured to suck oil from the bearing unit. The first valve is provided in the oil supply path. The first valve is switchable from a connected state to a disconnected state when the engine is to be stopped. The second valve is provided in, the oil discharge passage. when the engine is to be stopped, The second valve is switchable from a connected state to a disconnected state when the engine is to be stopped.

BRIEF DESCRIPTION OF THE DRAWINGS

FIGS. 5A and 5B are schematic diagrams briefly illustrating part of the oil supply device;

FIG. 7 is a schematic diagram briefly illustrating part of an oil supply device in another example of the present invention.

DETAILED DESCRIPTION

Figure 1:
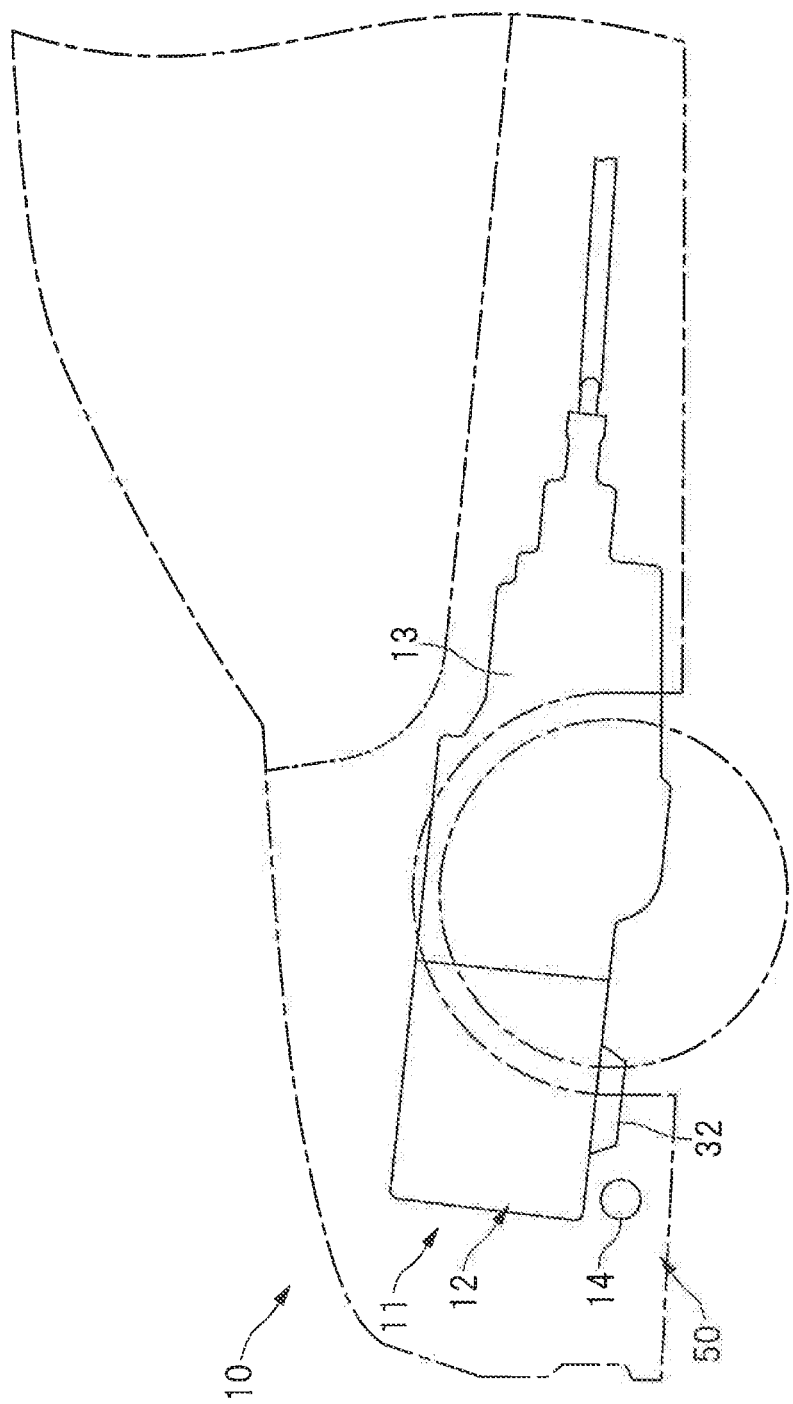
FIG. 1 is a schematic diagram illustrating an example of a power unit mounted on a vehicle.

Hereinafter, an example of the present invention will be described in detail with reference to the drawings. FIG. 1 is a schematic diagram illustrating an example of a power unit 11 mounted on a vehicle 10. As illustrated in FIG. 1 the power unit 11 mounted on the vehicle 10 has an engine 12 which is an internal-combustion engine, and a transmission 13 connected to the engine 12. In addition, a turbocharger 14 serving as a supercharger for increasing a filling efficiency by compressing intake air is installed under the engine 12. It is to be noted, that although the illustrated engine 12 is a horizontally opposed engine, the engine 12 not be limited to this and may be another type of engine.

Figure 2:
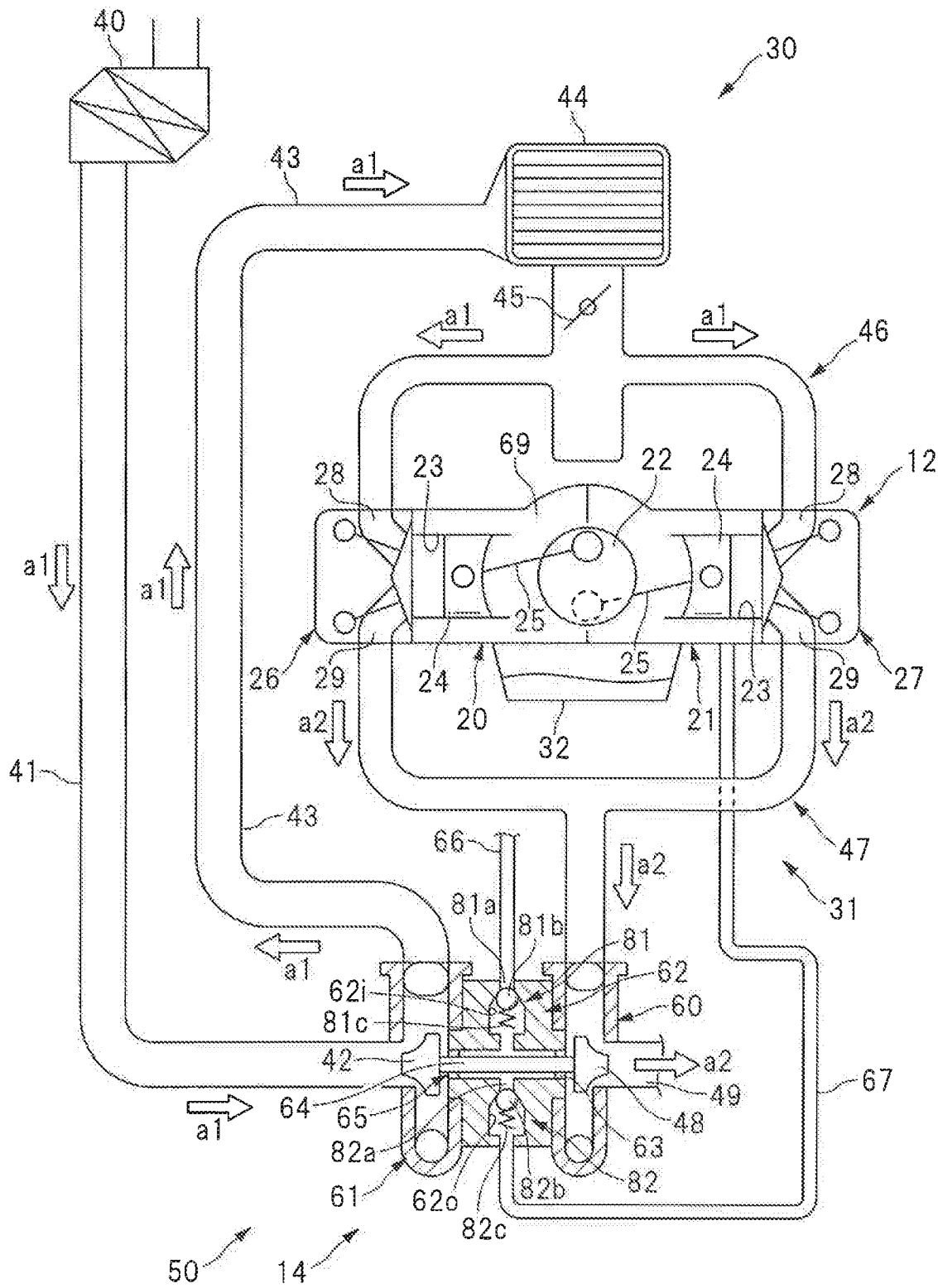
FIG. 2 is a schematic diagram illustrating an engine and its peripheral devices.

FIG. 2 is a schematic diagram illustrating the engine 12 and its peripheral devices. As illustrated in FIG. 2, the engine 12 has a cylinder block 20 that forms one of cylinder banks, a cylinder block 21 that forms the other of the cylinder banks, and a crankshaft 22 supported by the pair of the cylinder blocks 20, 21. A cylinder bore 23 is formed in the cylinder blocks 20, 21, and a piston 24 is housed in the cylinder bore 23. Also, the crankshaft 22 and the piston 24 are connected via a connecting rod 25.

Cylinder heads 26, 27 including a valve operating mechanism are mounted on the cylinder blocks 20, 21. An inlet port 28 and an exhaust port 29 are formed in each of the cylinder heads 26, 27. An intake system 30 is connected. to the inlet ports 28 of the cylinder heads 26, 27, and an exhaust system 31 is connected to the exhaust ports 29 of the cylinder heads 26, 27, in addition, an oil pan 32 that scores oil is mounted on the lower part of the cylinder blocks 20, 21.

The intake system 30 includes an air cleaner box 40, an air intake duct 41, a compressor 42, an air intake duct 43, an intercooler 44, a throttle valve 45, and an intake manifold 46. As indicated by arrow a1 of FIG. 2, intake air which has passed through the air cleaner box 40 is supplied to the inlet ports 28 of the cylinder heads 26, 27 through the air intake duct 41, the compressor 42, the air intake duct 43, the intercooler 44, the throttle valve 45, and the intake manifold 46.

The exhaust system 31 includes an exhaust manifold 47, a turbine 48, and an exhaust pipe 49. As indicated by arrow a2 of FIG. 2, exhaust gas exhausted through the exhaust port 29 is exhausted to the outside through the exhaust manifold 47, the turbine 48, and the exhaust pipe 49. The exhaust pipe 49 is connected to a catalytic converter and a muffler which are not illustrated, and exhaust gas is exhausted to the outside through the catalytic converter and the muffler.

Oil Supply Device

Figure 3:
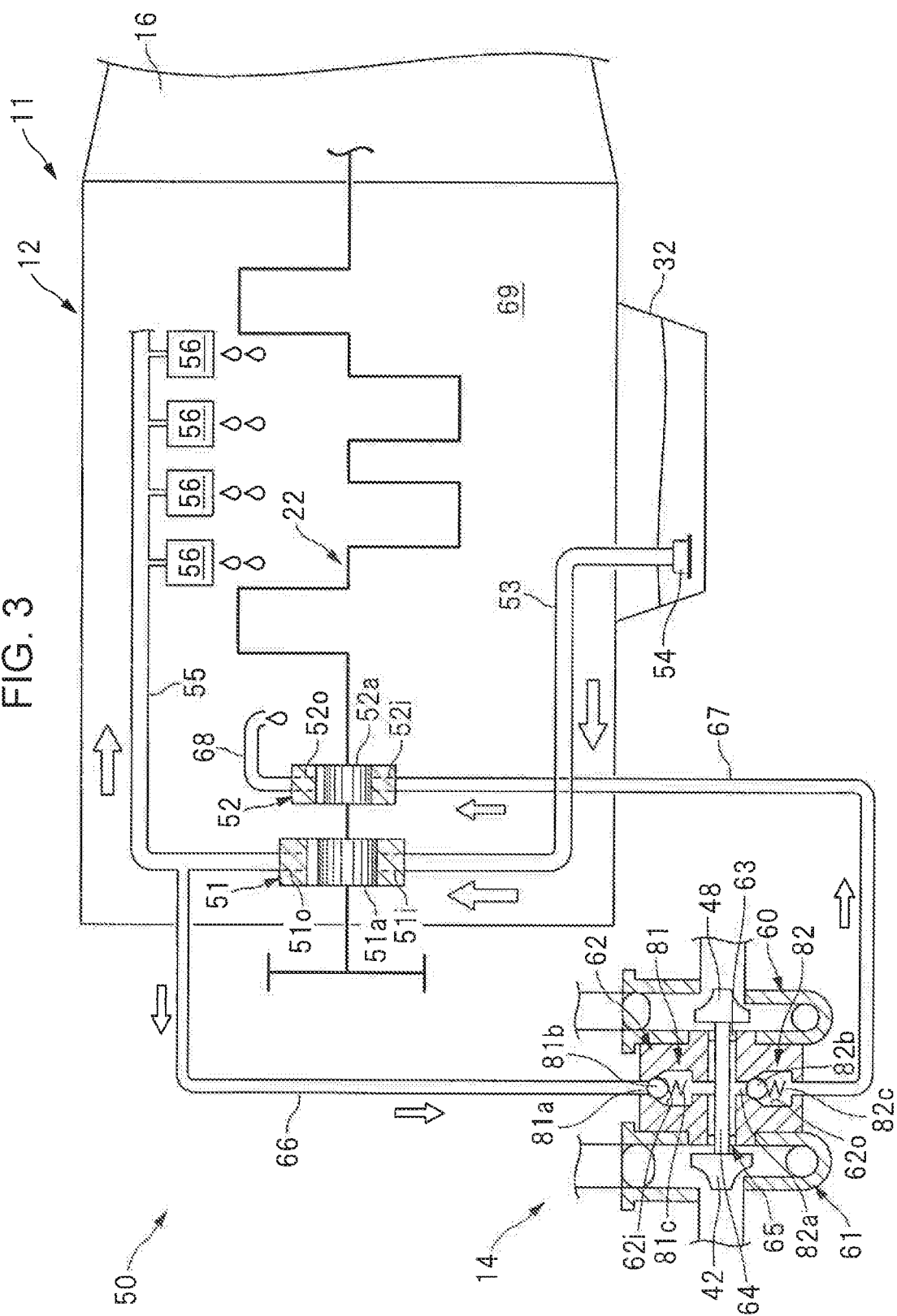
FIG. 3 is a schematic diagram illustrating the configuration of an oil supply device in an example of the present invention.

FIG. 3 is a schematic diagram illustrating the configuration of the oil supply device 50 in an example of the present invention. The white arrow illustrated in FIG. 3 is an arrow indicating the direction of flow of circulating oil.

As illustrated in FIG. 3, the oil supply device 50 has a main pump (the first oil pump) 51 as well as a scavenging pump (second oil pump) 52. The crankshaft 22 of the engine 12 is connected to a rotor 51*a* of the main pump 51 as well as a rotor 52*a* of the scavenging pump 52. An intake port 51*i* of the main pump 51 is connected to a strainer 54 in the oil pan 32 via an intake oil passage 53, and a discharge port 51*o* of the main pump 51 is connected to parts 56 needing lubrication, such as a crank journal 70 via a main oil passage 55. That is, the oil in the oil pan 32 is sucked by the main pump 51, and is supplied to the parts 56 needing lubrication from the main pump 51 by driving the main pump 51. The oil, which has lubricated the parts 56 needing lubrication, such as the crank journal 70, flows out from the parts 56 needing lubrication, and is guided to the oil pan 32.

As described above, the engine 12 is provided with the turbocharger 14 as the supercharger. The turbocharger 14 has a turbine housing 60 that houses the turbine 48, a compressor housing 61 that houses the compressor 42, and a bearing housing (housing) 62 disposed between the housings 60 and 61. A shaft 64 is rotatably supported by the bearing housing 62 via a bearing 63. In this manner, the turbocharger 14 is provided with the bearing unit 65 including the bearing housing 62, the bearing 63, and the shaft 64.

An oil introduction inlet (oil supply path) 62*i* is formed in an upper portion of the bearing housing 62, and an oil exhaust port (oil exhaust path) 62*o* is formed in a lower portion of the bearing housing 62. The oil introduction inlet 62*i* of the bearing housing 62 is connected to a supply oil passage (oil supply path) 66 branched from the main oil passage 55. Also, the oil exhaust port 62*o* of the bearing housing 62 is connected to an exhaust oil passage (oil exhaust path) 67 which is connected to an intake port 52*i* of the scavenging pump 52. Also, a discharge port 52*o* of the scavenging pump 52 is connected to a release oil passage 68, and the end of the release oil passage 68 is open to a crankcase 69.

That is, when the main pump 51 and the scavenging pump 52 are driven, the oil discharged from the main pump 51 is supplied to the bearing unit 65 through the oil supply path, such as the supply oil passage 66, and the oil supplied to the bearing unit 65 is sucked by the scavenging pump 52 through an oil exhaust path, such as the exhaust oil passage 67. The oil sucked by the scavenging pump 52 is discharged to the crankcase 69 and guided to the oil pan 32 again. Consequently, the oil can be passed to the bearing unit 65 of the turbocharger 14, and the bearing unit 65 can be appropriately lubricated by the oil. It is to be noted that the pump capacity of the scavenging pump 52 which sucks oil from the bearing unit 65 is designed such that the amount of oil flowing out from the bearing unit 65 is greater than the amount of oil flowing into the bearing unit 65 so that oil does not overflow from the bearing 63 of the bearing unit 65.

Also, since the turbocharger 14 is installed under the engine 12, both the supply oil passage 66 for supplying oil to the bearing unit 65 and the exhaust oil passage 67 for exhausting oil from the bearing unit 65 are provided extending upward over the bearing unit 65. Like this, in the structure in which the bearing unit 65 is disposed under the supply oil passage 66 and the exhaust oil passage 67, when oil circulation is stopped due to stopping of the engine, oil flows from the supply oil passage 66 and the exhaust oil passage 67 into the bearing unit 65 below. Thus, when the main pump 51 or the scavenging pump 52 is stopped due to stopping of the engine, oil flows into the bearing housing 62 from the surroundings during the engine stop, and oil may overflow from the bearing 63. It is to be noted that in the example illustrated, the turbocharger 14 is installed under the oil pan 32. In other words, the lower end of the turbocharger 14 projects downward under the lower end of the oil pan 32.

Figure 4:
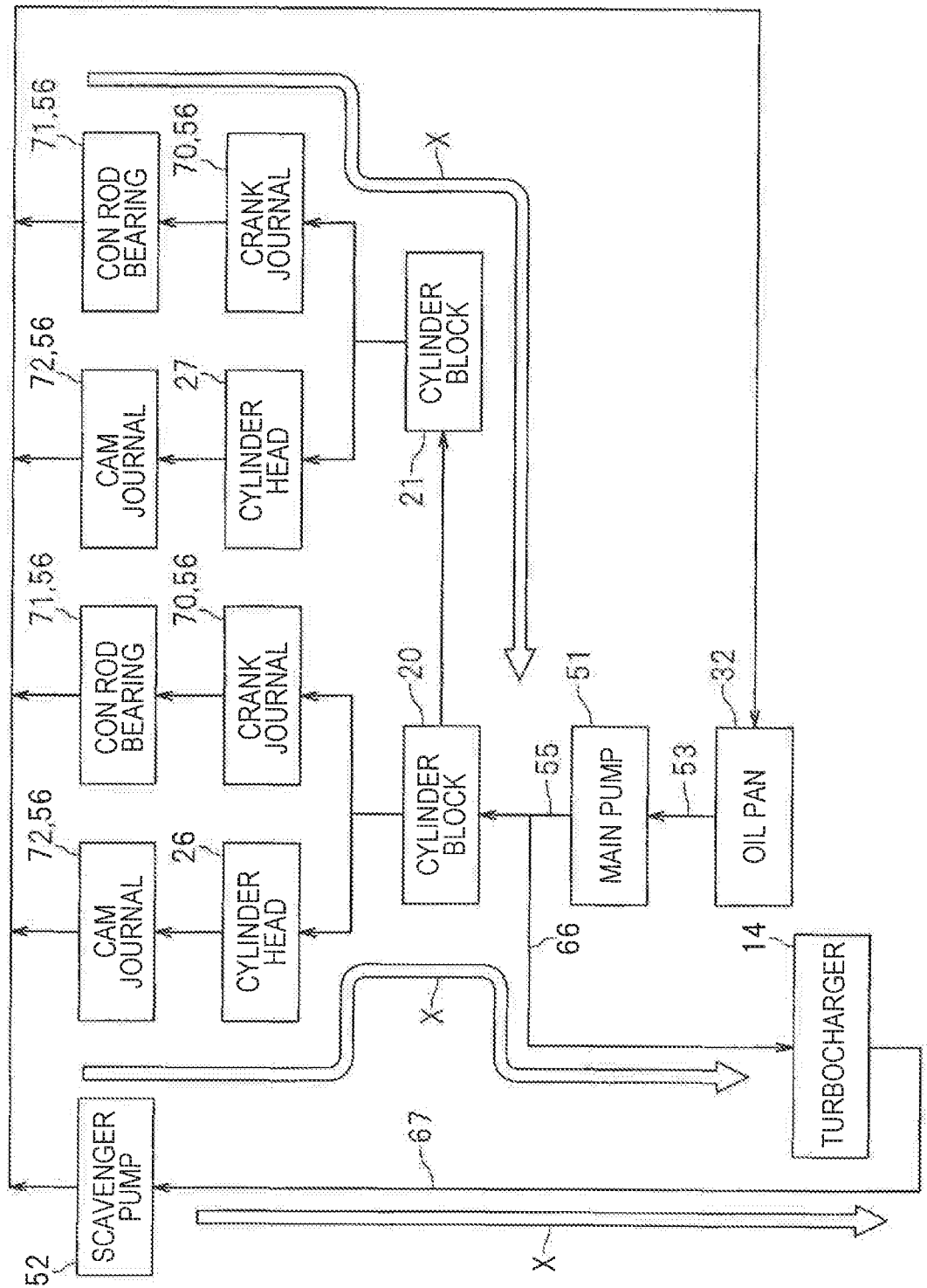
FIG. 4 is a schematic diagram briefly illustrating an example of an oil circulation path.

Here, FIG. 4 is a schematic diagram briefly illustrating an example of an oil circulation passage. As illustrated in FIG. 4, the oil stored in the oil pan 32 is supplied to the cylinder blocks 20, 21 from the main pump 51, and is supplied to the crank journal 70 which is the parts 56 needing lubrication, or a connecting rod bearing 71. Also, the oil squeezed and sent by the main pump 51 is supplied from the cylinder blocks 20, 21 to the cylinder heads 26, 27, and is supplied to the cam journal 72 which is the parts 56 needing lubrication. The oil which has lubricated the parts 56 needing lubrication, such as the crank journal 70, the connecting rod bearing 71, and the cam journal 72 is returned to the oil pan 32. Also, the oil squeezed and sent by the main pump 51 is supplied to the bearing unit 65 of the turbocharger 14. The oil which has lubricated the turbocharger 14 is sucked by the scavenging pump 52, and is returned to the oil pan 32.

As illustrated in FIG. 4, the turbocharger 14 communicates with not only the supply oil passage 66 and the exhaust oil passage 67, but also oil passages formed in the cylinder blocks 20, 21 and the cylinder heads 26, 27 via the supply oil passage 66. Therefore, when the engine 12 stopped, and the scavenging pump 52 is stopped, as indicated by white arrow X in FIG. 4, oil flows from various oil passages above into the turbocharger 14 below, and oil may overflow from the bearing unit 65 of the turbocharger 14 during the engine stop. Thus, as described later, the oil supply device 50 in an example of the present invention is configured to prevent oil flow into the bearing unit 65 during the engine stop.

Oil Flow Prevention Structure

The oil flow prevention structure for the turbocharger 14 will be described. As illustrated in FIG. 3, an upstream side check valve (a first valve, a first check valve) 81 is incorporated in the oil introduction inlet 62*i* of the bearing housing 62, and a downstream side check valve (a second valve, a second check valve) 82 is incorporated in the oil exhaust port 62*o* of the bearing housing 62. In other words, the upstream side check valve 81 is provided in the oil supply path including the supply oil passage 66 and the oil introduction inlet 62*i*, and the downstream side check valve 82 is provided in the oil exhaust path including the exhaust oil passage 67 and the oil exhaust port 62*o*.

The upstream side check valve 81 has a valve body 81*b* that opens and closes a valve port 81*a*, and a spring 81*c* that urges the valve body 81*b* against the valve port 81*a*. When the difference between the oil pressures applied to the upstream side and the downstream side of the valve body 81*b* is increased, the valve body 81*b* is separated from the valve port 81*a*, and the upstream side check valve 81 is switched to a connected state in which the valve port 81*a* is opened. On the other hand, when the difference between the oil pressures applied to the upstream side and the downstream side of the valve body 81*b* is decreased, the valve body 81*b* comes into contact with the valve port 81*a*, and the upstream side check valve 81 is switched to a disconnected state in which the valve port 81*a* is closed. When being switched to a connected state, the upstream side check valve 81 allows oil flow from the main pump 51 to the bearing unit 65, but when being switched to a disconnected state, the upstream side check valve 81 blocks oil flow from the bearing unit 65 to the main pump 51.

Specifically, in a situation where the main pump 51 and the scavenging pump 52 are driven by the engine 12, and oil flows from the main pump 51 into the valve port 81a, the valve body 81b is pushed in by the flowing oil, and the valve port 81a is opened. In contrast, in a situation where the main pump 51 and the scavenging pump 52 are stopped due to stopping of the engine, and the self-weight of oil is applied to the valve port 81a, a closed state of the valve port 81a is maintained by the spring force of the spring 81c. That is, in a situation where the main pump 51 and the scavenging pump 52 are stopped, in other words, in a situation where only the self-weight of oil is applied to the valve port 81a, the spring force of the spring 81c that urges against the valve body 81b is set so as to maintain a closed state of the valve port 81a.

Also, the downstream side check valve 82 has a valve body 82b that opens and closes a valve port 82a, and a spring 82c that urges the valve body 82b against the valve port 82a. When the difference between the oil pressures applied to the upstream side and the downstream side of the valve body 82b is increased, the valve body 82b is separated from the valve port 82a, and the downstream side check valve 82 is switched to a connected state in which the valve port 82a is opened. On the other hand, when the difference between the oil pressures applied to the upstream side and the downstream side of the valve body 82b is decreased, the valve body 82b comes into contact with the valve port 82a, and the downstream side check valve 82 is switched to a disconnected state in which the valve port 82a is closed. When being switched to a connected state, the downstream side check valve 82 allows oil flow from the bearing unit 65 to the scavenging pump 52, but when being switched to a disconnected state, the downstream side check valve 82 blocks oil flow from the scavenging pump 52 to the bearing unit 65.

Specifically, in a situation where the main pump 51 and the scavenging pump 52 are driven by the engine 12, and the oil which has passed the bearing unit 65 flows into the valve port 82a, the valve body 82b is pushed in by the flowing oil, and the valve port 82a is opened. In contrast, in a situation where the main pump 51 and the scavenging pump 52 are stopped due to stopping of the engine, and the self-weight of oil is applied to the valve port 82a, a closed state of the valve port 82a is maintained by the spring force of the spring 82c. That is, in a situation where the main pump 51 and the scavenging pump 52 are stopped, in other words, in a situation where only the self-weight of oil is applied to the valve port 82a, the spring force of the spring 82c that urges against the valve body 82b is set so as to maintain a closed state of the valve port 82a.

Operation Situation of Check Valve

FIGS. 5A and 5B are schematic diagrams briefly illustrating part of the oil supply device 50. FIG. 5A illustrates a situation of the engine during operation, and FIG. 5B illustrates a situation of the engine during stop.

As illustrated in FIG. 5A, during engine operation in which the main pump 51 and the scavenging pump 52 are driven, oil squeezed by the main pump 51 is sent to the bearing unit 65, and oil is sucked from the bearing unit 65 by the scavenging pump 52. Thus, as indicated by arrow α, oil is passed from the supply oil passage 66 to the exhaust oil passage 67 through the bearing unit 65. At this point, the upstream side check valve 81 and the downstream side check valve 82 are operated in a connected state by the thrust force of the oil which is squeezed and sent by the main pump 51 and the scavenging pump 52, and both the valve port 81a of the upstream side check valve 81 and the valve port 82a of the downstream side check valve 82 are opened. Consequently, the bearing unit 65 of the turbocharger 14 can be appropriately lubricated without the flow of oil being restricted by the upstream side check valve 81 and the downstream side check valve 82.

On the other hand, as illustrated in FIG. 5B, during engine stop in which the main pump 51 and the scavenging pump 52 are stopped, oil flow from the supply oil passage 66 to the exhaust oil passage 67 through the bearing unit 65 is stopped, and thus the upstream side check valve 81 and the downstream side check valve 82 are operated in a disconnected state, and both the valve port 81a of the upstream side check valve 81 and the valve port 82a of the downstream side check valve 82 are closed. At this point, as indicated, by arrow β, the self-weight of the oil within the supply oil passage 66 is applied to the valve port 81a of the upstream side check valve 81 in the direction in which the valve port 81a is opened. However, the spring force of the spring 81c is set such that the valve body 81b is not separated from the valve port 81a, and thus the upstream side check valve 81 is maintained in a disconnected state. As indicated by arrow γ, the self-weight of the oil within the exhaust oil passage 67 is applied to the downstream side check valve 82 in the direction in which the valve port 82a is closed, and thus the downstream side check valve 82 is maintained in a disconnected state.

As described so far, during engine operation, the upstream side check valve 81 and the downstream side check valve 82 are controlled in a connected state, whereas during engine stop, the upstream side check valve 81 and the downstream side check valve 82 are controlled in a disconnected state. In other words, when the engine 12 in operation is stopped, the upstream side check valve 81 and the downstream side check valve 82 are switched from a connected state to a disconnected state. Thus, no oil flows into the bearing unit 65 of the turbocharger 14 from an oil passage in the surrounding during engine stop, and it is possible to prevent the oil from escaping from the bearing unit 65 to the turbine 48 and the compressor 42. Also, during engine stop, both the upstream side check valve 81 and the downstream side check valve 82 are disconnected, and thus even during engine stop, a predetermined amount of oil can be sealed in the bearing unit 65 of the turbocharger 14. Thus, the bearing unit 65 can be appropriately lubricated immediately after the start of the engine 12, and thus the durability of the turbocharger 14 can be improved.

Another Example

Figure 6:
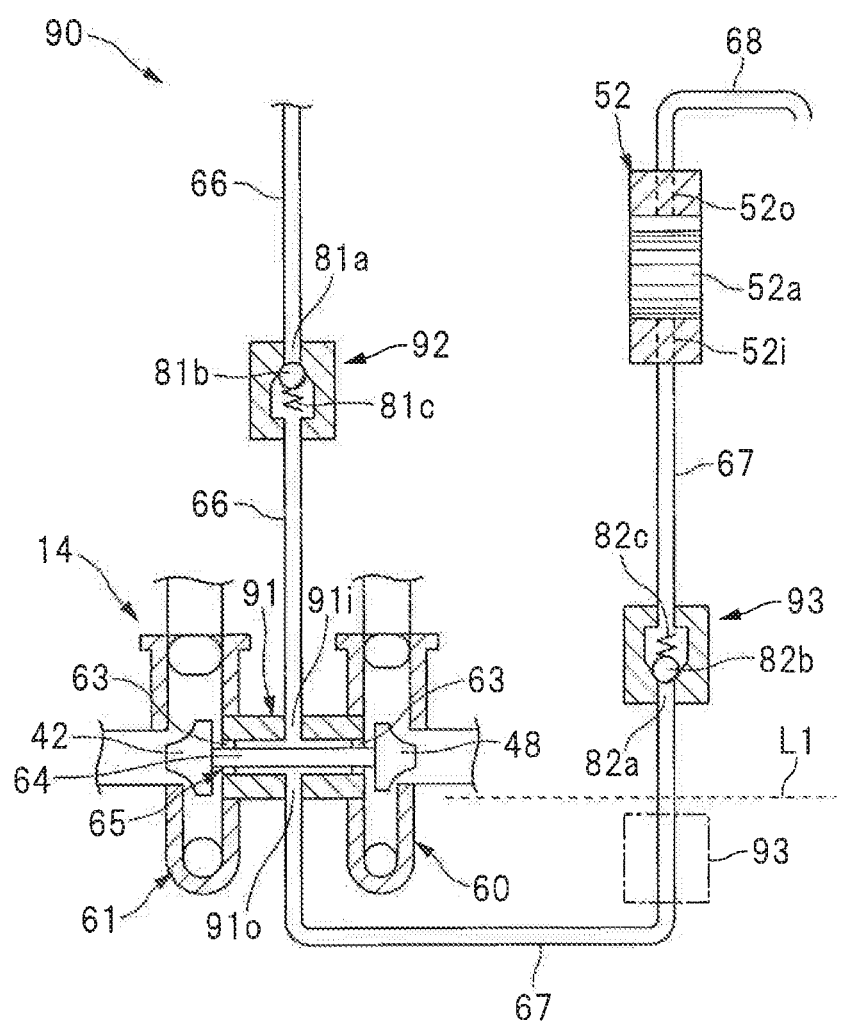
FIG. 6 is a schematic diagram, briefly illustrating part of an oil supply device in another example of the present invention.

Although the upstream side check valve 81 and the downstream side check valve 82 are built in the bearing housing 62 of the turbocharger 14 in the above description, without being limited to this, the upstream side check valve 81 and the downstream side check valve 82 may be separated from the bearing housing 62. Here, FIG. 6 is a schematic diagram briefly illustrating part of the oil supply device 90 in another example of the present invention. In FIG. 6, the same member as the member illustrated in FIG. 3 is labeled with the same symbol, and a description thereof is omitted.

As illustrated in FIG. 6, the bearing unit 65 of the turbocharger 14 is provided with a bearing housing (housing) 91 that is disposed between the housings 60, 61. An oil introduction inlet 91i is formed in an upper portion of the bearing housing 91, and an oil exhaust port 91o is formed in a lower portion of the bearing housing 91. The oil introduction inlet 91i of the bearing housing 91 is connected to the supply oil passage 66 which is branched from the main oil passage 55. Also, the oil exhaust port 91o of the bearing housing 91 is connected to the exhaust oil passage 67 which is connected to the intake port 52i of the scavenging pump 52.

The supply oil passage 66, which is an oil supply path, is provided with an upstream side check valve (a first valve, a first check valve) 92 that is switchable between a connected state and a disconnected state. Similarly to the upstream side check valve 81 described above, the upstream side check valve 92 allows oil flow from the main pump 51 to the bearing unit 65, but blocks oil flow from the bearing unit 65 to the main pump 51. Also, the exhaust oil passage 67 which is an oil exhaust path is provided with a downstream side check valve (a second valve, a second check valve) 93 that is switchable between a connected state and a disconnected state. Similarly to the downstream side check valve 82 described above, the downstream side check valve 93 allows oil flow from the bearing unit 65 to the scavenging pump 52, but blocks oil flow from the scavenging pump 52 to the bearing unit 65.

Like this, even when the upstream side check valve 92 and the downstream side check valve 93 are separated from the bearing housing 91, the oil supply device 90 can be functioned similarly to the oil supply device 50 described above. Specifically, when the engine 12 in operation is stopped, the upstream side check valve 92 and the downstream side check valve 93 are switched from a connected state to a disconnected state. Thus, no oil flows into the bearing unit 65 of the turbocharger 14 from an oil passage in the surrounding during engine stop, and it is possible to prevent the oil from escaping from the bearing unit 65 to the turbine 48 and the compressor 42. Also, during engine stop, a predetermined amount of oil is sealed in the bearing unit 65, and thus the bearing unit 65 can be appropriately lubricated immediately after the start of the engine 12, and the durability of the turbocharger 14 can be improved.

When the upstream side check valve 92 and the downstream side check valve 93 are separated from the bearing housing 91, from a viewpoint of reducing oil flow into the bearing unit 65 during engine stop, it is desirable that the upstream side check valve 92 and the downstream side check valve 93 be placed closer to the bearing housing 91. Also, when an oil passage is connected to a lower portion of the bearing housing 91 like the exhaust oil passage 67 illustrated in FIG. 6, it is preferable to install the downstream side check valve 93 so as to block the exhaust oil passage 67 below the bearing unit 65 (That is, below a height position L1) as indicated by a dashed dotted line in FIG. 6. Thus, during engine stop, the self-weight of the oil within the exhaust oil passage 67 is not applied to the oil exhaust port 91o, and oil can be prevented from flowing into the bearing unit 65. It is to be noted that in the example indicated by a dashed dotted line, the upper end of the downstream side check valve 93 is positioned below the height position L1. However, without being limited to this, as long as the exhaust oil passage 67 is blocked below the height position L1, the upper end of the downstream side check valve 93 may be positioned above the height position L1.

Another Example

Although the check valve which is operated by a pressure difference is used as the first valve and the second valve in the above description, without being limited to this, a magnetic valve controlled by a controller may be used as the first valve and the second valve. Here, FIG. 7 is a schematic diagram briefly illustrating part of the oil supply device 100 in another example of the present invention. In FIG. 7, the same member as the member illustrated in FIG. 3 or FIG. 6 is labeled with the same symbol, and a description thereof is omitted.

As illustrated in FIG. 7, too supply oil passage 66, which is an oil supply path, is provided with an upstream side magnetic valve (a first valve) 101 that is switchable between a connected state and a disconnected state. The upstream side magnetic valve 101 is controlled in a connected state in which the valve port 101a is opened, and in a disconnected state in which the valve port 101a is closed, by an output current from a controller 102 including a microcomputer. When being switched in a connected state, the upstream side magnetic valve 101 allows oil flow from the main pump 51 to the bearing unit 65, but when being switched to a disconnected state, blocks oil flow from, the bearing unit 65 to the main pump 51. Also, the exhaust oil passage 67, which is an oil exhaust path, is provided with a downstream side magnetic valve (a second valve) 103 that is switchable between a connected state and a disconnected state. Similarly to the upstream side magnetic valve 101, a downstream side magnetic valve 103 is controlled in a connected state in which a valve port 103a is opened, and in a disconnected state in which the valve port 103a is closed, by an output current from the controller 102. When being switched in a connected state, the downstream side magnetic valve 103 allows oil flow from the bearing unit 65 to the scavenging pump 52, but when being switched to a disconnected state, blocks oil flow from the scavenging pump 52 to the bearing unit 65.

Like this, even when the magnetic valves 101, 103 are used as the first valve and the second valve, the oil supply device 100 can be functioned similarly to the above-described oil supply devices 50, 90 by controlling the magnetic valves 101, 103 according to the operating situation of the engine 12. That is, during engine operation, the upstream side magnetic valve 101 and the downstream side magnetic valve 103 are controlled in a connected state, whereas during engine stop, the upstream side magnetic valve 101 and the downstream side magnetic valve 103 are controlled in a disconnected state. That is, when the engine 12 in operation is stopped, the upstream side magnetic valve 101 and the downstream side magnetic valve 103 are switched from a connected state to a disconnected state. Thus, no oil flows into the bearing unit 65 of the turbocharger 14 from an oil passage in the surrounding during engine stop, and it is possible to prevent the oil from escaping from the bearing unit 65 to the turbine 48 and the compressor 42. Also, during engine stop, a predetermined amount of oil is sealed in the bearing unit 65, and thus the bearing unit 65 can be appropriately lubricated immediately after the start of the engine 12, and the durability of the turbocharger 14 can be improved.

Also, from a viewpoint of reducing oil flow into the bearing unit 65 during engine stop, it is desirable that the upstream side magnetic valve 101 and the downstream side magnetic valve 103 be placed closer to the bearing housing 91. Also, when an oil passage is connected to a lower portion of the bearing housing 91 like the exhaust oil passage 67 illustrated in FIG. 7, it is preferable to install the downstream side magnetic valve 103 so as to block the exhaust oil passage 67 below the bearing unit 65 (that is, below a height position L1) as indicated by a dashed dotted line in FIG. 7. Thus, during engine stop, the self-weight of the oil within the exhaust oil passage 67 is not applied to the oil exhaust port 91o, and oil can be prevented from flowing into the bearing unit 65. It is to be noted that in the example indicated by a dashed dotted line, the downstream side magnetic valve 103 is positioned below the height position L1. However, without being limited to this, as long as the exhaust oil passage 67 is blocked below the height position L1, the upper end of the downstream side magnetic valve 103 may be positioned above the height position L1.

The present invention is not limited to the examples, and various modifications may be made in a range without departing from the spirit of the invention. In the illustrated example, the main pump 51 and the scavenging pump 52 are driven by the crankshaft 22, however, the power source is not limited to the crankshaft. For instance, the main pump 51 and the scavenging pump 52 may be driven by a camshaft, or the main pump 51 and the scavenging pump 52 may be driven by an electric motor.

In the example illustrated in FIG. 6, the bearing housing 91 and the downstream side check valve 93 are connected by the exhaust oil passage 67, and a catch tank may be provided in the exhaust oil passage 67. Similarly, in the example illustrated in FIG. 7, the bearing housing 91 and the downstream side magnetic valve 103 are connected by the exhaust oil passage 67, and a catch tank may be provided in the exhaust oil passage 67. In this manner, a catch tank having a predetermined capacity is provided on the downstream side of the bearing unit 65, and thereby oil can be stored in the catch tank, and oil can be prevented from overflowing from the bearing unit 65.

In the example illustrated in FIG. 5, both the upstream side check valve 81 and the downstream side check valve 82 are provided in the bearing housing 62, and in the example illustrated in FIG. 6, both the upstream side check valve 92 and the downstream side check valve 93 are separated from the bearing housing 91. However, without being limited to this, one of the check valves may be provided in the bearing housing, and the other of the check valves may be separated from the bearing housing, for instance. In the example illustrated in FIG. 7, both the upstream side magnetic valve 101 and the downstream side magnetic valve 103 are separated from the bearing housing 91. However, without being limited to this, both magnetic valves may be provided in the bearing housing, for instance. Also, one of the magnetic valves is provided in the bearing housing, and the other of the magnetic valves may be separated from the bearing housing 91.

In the illustrated example, the oil introduction inlets 62i, 91i are formed in an upper portion of the bearing housings 62, 91, and the oil exhaust ports 62o, 91o are formed in a lower portion of the bearing housings 62, 91 so that oil is passed from an upper portion to a lower portion of the bearing housings 62, 91. However, without being limited to this, the oil introduction inlets 62i, 91i and the oil exhaust ports 62o, 91o may be formed at the same height position, so that oil may be passed in a horizontal direction of the bearing housings 62, 91, for instance. Also, the oil introduction inlets 62i, 91i may be formed in a lower portion of the bearing housings 62, 91, and the oil exhaust ports 62o, 91o may be formed in an upper portion of the bearing housings 62, 91 so that oil may be passed from a lower portion to an upper portion of the bearing housings 62, 91.

The invention claimed is:

1. An oil supply device configured to supply oil to a turbocharger of an engine, the oil supply device comprising:
a first oil pump coupled to a bearing unit of the turbocharger via an oil supply path, the first oil pump being configured to supply oil to the bearing unit;
a second oil pump coupled to the bearing unit via an oil discharge passage, the second oil pump being configured to suck oil from the bearing unit;
a first valve provided in the oil supply path, the first valve being switchable from a flow-through state to a flow blockage state when the engine is to be stopped; and
a second valve provided in the oil discharge passage, the second valve being switchable from a flow-through state to a flow blockage state when the engine is to be stopped, and wherein at least one of the first valve and the second valve is provided in a housing of the turbocharger.

2. The oil supply device according to claim 1,
wherein both the oil supply path and the oil discharge passage extend upward over the bearing unit.

3. The oil supply device according to claim 2,
wherein the first valve is a first check valve that allows oil flow from the first oil pump to the bearing unit, while blocking oil flow from the bearing unit to the first oil pump, and
the second valve is a second check valve that allows oil flow from the bearing unit to the second oil pump, while blocking oil flow from the second oil pump to the bearing unit.

4. The oil supply device according to claim 1,
wherein the first valve is a first check valve that allows oil flow from the first oil pump to the bearing unit, while blocking oil flow from the bearing unit to the first oil pump, and
the second valve is a second check valve that allows oil flow from the bearing unit to the second oil pump, while blocking oil flow from the second oil pump to the bearing unit.

5. The oil supply device according to claim 1,
wherein at least the first valve is provided in the housing of the turbocharger.

6. The oil supply device according to claim 1,
wherein at least the second valve is provided in the housing of the turbocharger.

7. The oil supply device according to claim 1,
wherein both the first valve and the second valve are provided in the housing of the turbocharger.

8. The oil supply device according to claim 1 wherein both the first and second oil pumps are supported within the engine housing.

9. The oil supply device according to claim 1 wherein both the first and second oil pumps are driven by a common shaft.

10. The oil supply device according to claim 9 wherein the common shaft is a crankshaft of the engine.

11. An oil supply device configured to supply oil to a turbocharger of an engine, the oil supply device comprising:
a first oil pump coupled to a bearing unit of the turbocharger via an oil supply path, the first oil pump being configured to supply oil to the bearing unit and to an additional engine part needing lubricating from which the oil flows down to an oil pan;
a second oil pump coupled to the bearing unit via an oil discharge passage, the second oil pump being configured to suck oil from the bearing unit and supply oil to another engine part needing lubricating from which the oil flows down to an oil pan;

a first valve provided in the oil supply path, the first valve being switchable from a flow-through state to a flow blockage state when the engine is to be stopped; and a second valve provided in the oil discharge passage, the second valve being switchable from a flow-through state to a flow blockage state when the engine is to be stopped.

12. The oil supply device according to claim 11, wherein the additional engine part and the another engine part include respective portions of a common crankshaft engine part.

13. The oil supply device according to claim 11, wherein at least one of the first valve and the second valve is provided in a housing of the turbocharger.

14. The oil supply device according to claim 11, wherein at least the second valve is provided in a housing of the turbocharger.

15. The oil supply device according to claim 11, wherein at least the first valve is provided in a housing of the turbocharger.

16. The oil supply device according to claim 11, wherein both the first valve and the second valve are provided in a housing of the turbocharger.

17. The oil supply device according to claim 11 wherein both the first and second oil pumps are supported within the engine housing.

18. The oil supply device according to claim 11 wherein both the first and second oil pumps are driven by a common shaft.

19. The oil supply device according to claim 11,
wherein the first valve is a first check valve that allows oil flow from the first oil pump to the bearing unit, while blocking oil flow from the bearing unit to the first oil pump, and the second valve is a second check valve that allows oil flow from the bearing unit to the second oil pump, while blocking oil flow from the second oil pump to the bearing unit.

20. The oil supply device according to claim 11,
wherein both the oil supply path and the oil discharge passage extend upward over the bearing unit.

* * * * *